United States Patent Office 3,413,075
Patented Nov. 26, 1968

3,413,075
AZO DYESTUFF MIXTURES AND AROMATIC POLYESTER FIBERS COLORED THEREWITH
Albert C. Rotcop, Passaic, N.J., and Herman P. Baumann, Charlotte, N.C., assignors to American Aniline Products, Inc., a corporation of Delaware
No Drawing. Filed Feb. 8, 1966, Ser. No. 525,842
4 Claims. (Cl. 8—26)

ABSTRACT OF THE DISCLOSURE

Polyester fibres are dyed in uniform black shades with a dyestuff mixture of 50 to 80% by weight of a blue monoazo component such as:

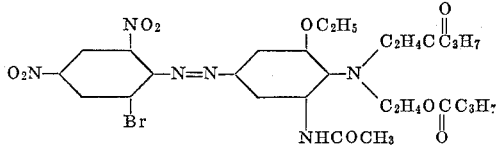

and 20 to 50% by weight of an orange monoazo component containing a monoazo dye such as:

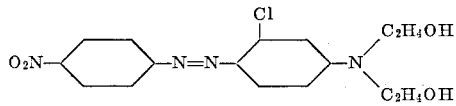

and a disazo dye such as:

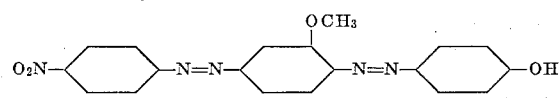

The individual components of the mixture effectively penetrate and fix on the fiber at approximately the same rate at a given temperature, which can be varied over a range of 180–220° C., using the Thermosol process.

---

This invention relates to novel mixtures of mono- and dis-azo dyestuffs. In one specific aspect it relates to mixtures of azo dyestuffs having a remarkable and uniform affinity for aromatic polyester fibers. In another aspect, it relates to the continuous dyeing of aromatic polyester fibers, e.g., polyethylene terephthalate or "Dacron," with azo dyestuffs to produce dyeings having excellent substantivity and sublimation fastness, and good light fastness.

In recent years, there has been a considerable effort by the dyestuffs industry to find suitable materials for coloring aromatic polyester fibers. These fibers, which have outstanding utility as textile materials, are made, for example, by heating a glycol of the formula: $HO(CH_2)_nOH$, wherein $n$ is an integer greater than one, but not exceeding ten, with isophthalic or terephthalic acid or with an ester-forming derivative thereof, for example, an aliphatic or aryl ester or half ester, an acid halide or an ammonium or an amine salt, under conditions at which polycondensation is effected. Of these polyesters, polyethylene terephthalate or "Dacron" has made remarkable impact on the textile industry.

Aromatic polyesters have poor affinity for dyestuffs and they do not readily absorb aqueous liquids. In the continuous dyeing of such fibers, serious problems exist in getting sufficient padding liquor on the fibers along with sufficient dye, and in accelerating the rate of diffusion of the dye inside the fiber. It is of great importance that the goods should take up as much dye liquor as possible and that the rate of diffusion and, consequently, the speed of fixation of the dye should be as high as possible. These problems become more acute when mixtures of dyestuffs are used because of the variation of properties of the individual components of such mixtures.

It is common practice in the dyestuffs industry to mix blue and orange dyestuffs to make blacks. Because of the considerable differences between individual dyes in their rate of penetration and fixation on polyester fibers, it is not possible to prophesy the behavior characteristics of particular mixtures when applied to these fibers by standard commercial processes. Polyesters are conventionally dyed by solvent-dyeing methods, disperse-dyeing methods or by thermo-fixation methods, such as the "Thermosol" process. This process, which involves the use of controlled heat, such as hot air or heated contact rolls, is conveniently used for dyeing polyester and polyamide fibers and mixtures containing these fibers. Temperatures of 180–220° C. (ca. 360–425° F.) are used for 30 to 90 seconds. If the fabric contains cotton or viscose rayon, apart from synthetic fibers, there is no danger of damaging cellulosic portion, but if wool is present, the temperature must be kept within 180–200° C. and the time must be reduced to 30 seconds.

It is known from U.S. Patent 3,122,410 that certain blue mono-azo dyestuffs can be mixed with cyanoethylated amino mono-azo oranges to produce blacks. Although such blacks have many commercially useful properties, they are limited by the methods of application that can be used to color polyester fibers therewith. In particular, these mixed dyestuffs are very difficult to apply by the Thermosol process because of variations in the controlled temperature across the width of the goods which make it necessary for any dyestuff to yield its correct shade under small degrees of temperature variation. Using the known mixed black dyestuffs, such minor temperature variations have an unfortunate effect on shade.

We have discovered a novel dyestuff mixture that surprisingly colors polyester fibers in jet black shades of commercially acceptable light fastness, substantivity, and fastness to sublimation. Our unique blend of azo dyestuffs is a combination of mono- and dis-azo dyes in which the individual components effectively penetrate and fix on the fiber at approximately the same rate under given conditions of temperature, which can be varied over the entire range of temperatures useful in the Thermosol process. Thus, a greater latitude in useful temperatures in the Thermosol process, which is an important requirement for the textile mills, is permissible using the dyestuffs of the invention.

In accordance with the invention, a stable dyeing composition is prepared by formulating a mixture containing 50–80% by weight of pure color of (a) a blue component consisting essentially of one or more mono-azo dye-stuffs of the formula:

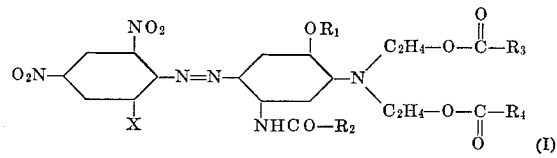

wherein X represents bromine or chlorine, $R_1$ is an alkyl radical having from 1–4 carbon atoms and $R_2$, $R_3$, and $R_4$ can be the same or different alkyl radicals having from one to eight carbon atoms; and 20–50% by weight of pure color of (b) an orange component consisting essentially of 10–50% by weight of pure color of (1) one or more dis-azo dyestuffs of the formula:

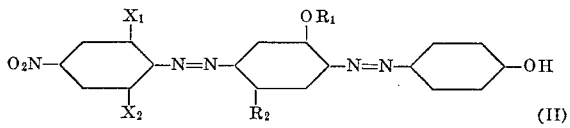

wherein $X_1$ and $X_2$ are hydrogen, bromine, or chlorine, $R_1$ is an alkyl radical having from one to four carbon atoms and $R_2$ is lower alkyl or hydrogen; and 50–90% by weight of pure color of (b) one or more mono-azo dyestuffs of the formula

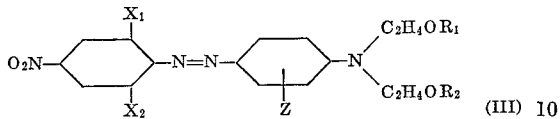 (III)

wherein $X_1$ and $X_2$ are hydrogen, bromine, and chlorine, $Z$ is hydrogen, lower alkyl, bromine or chlorine, and $R_1$ and $R_2$ are hydrogen or acyl radicals having fron one to eight carbons atoms.

The above mixture of dyestuffs is applied to aromatic polyester fibers as a mixture of standardized dispersed color powders or pastes obtained by wet milling each of the individual color components with at least one dispersant which when milled with the color tends to coat the surface of the color to give a colloidal suspension in water. Sufficient dispersant is added to give a dispersed color, which after milling flows freely and suspends well in water so that it will not cause specking on the fiber when used by the dye house. In the preparation of the dispersion at least one wetting agent is usually added to adjust the surface tension. The wetting agent allows the dispersed material to wet out rapidly when added to water. If a wetting agent is not used there is some tendency of the dispersed color to float on the surface of water. Dispersed pastes or powders contain, in addition, a standardizing agent or diluent, which is added to bring the dispersed material to a standard strength, generally between about 10–60% by weight active (pure color) dyestuff base.

The blue component of the dyestuff mixture of the invention is available commercially or can be made by known methods of diazotizing 1-amino-2,4-dinitro-6-halobenzene in nitrosylsulfuric acid and coupling it with a compound of the formula:

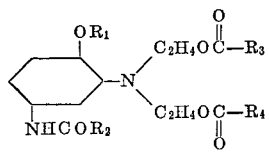

wherein $R_1$, $R_2$, $R_3$, and $R_4$ have the meanings given aforesaid. The coupling reaction is carried out in an acid medium, preferably with the use of an acid-binding agent, such as sodium acetate. The precipitated monoazo dyestuffs are filtered off, washed, and standardized.

The disazo orange component is commercially available or it can be prepared by adding diazotized p-nitroaniline (or an appropriately substituted derivative thereof corresponding to the above formula) to a solution of o-anisidinomethanesulfonic acid or to a solution of o-anisidine (or p-phenetidine, etc.) containing a substituent in the 5-position corresponding to the above formula. The coupling reaction is performed in one of two ways: (1) with o-anisidinomethanesulfonic acid the reaction is carried out under neutral or slightly alkaline conditions, either sodium acetate or sodium bicarbonate can be used to give the desired condition; (2) with the o-anisidines substituted in the 5-position the reaction is carried out in the presence of dilute mineral acid. If the coupling component is o-anisidinomethanesulfonic acid, the aminoazobenzene required for the subsequent diazotization is obtained by hydrolysis of the coupling product in a relatively concentrated solution of an alkali metal hydroxide at relatively elevated temperature. During this operation the methane-sulfonic acid is split off. The disazo dyestuff used in the invention is made by coupling the diazotized 4'-nitro-3-alkoxy-4-aminoazobenzene thus prepared with phenol by adding the diazonium salt solution to a cold aqueous alkaline solution of phenol. The mixture is allowed to react for several hours at room temperature and is thereafter filtered and washed alkali free. There is thus obtained a diazo compound of the aforesaid formula in the form of a wet paste, which is then standardized.

The monoazo orange component of the mixture is available commercially or is made by diazotizing para-nitroaniline (or an appropriately substituted para-nitroaniline) in a mineral acid, e.g., nitrosylsulfuric acid, and coupling with an amine of the formula:

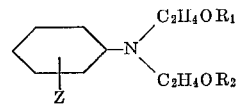

wherein $Z$, $R_1$, and $R_2$ have the meanings given aforesaid. Coupling is accomplished in a conventional manner in a dilute solution of mineral acid. The product is recovered by filtration, washed acid free, and standardized.

The individual components may be standardized either as a disperse paste or a disperse powder by any of the basic standardizing techniques that have been known to the art for many years; i.e., by the use of appropriate amounts of common dispersants and standardizing agents, usually together with small amounts of anionic wetting agent to assist in dispersion.

Standardized pastes are made by wet milling the dye in conventional equipment in the presence of a dispersing agent, preferably sodium lignin sulfonate or sodium alkylnaphthalene sulfonate. Various other commercially available dispersing agents, such as sodium salts of carboxylated polyelectrolytes and the naphthalene sulfonates, e.g., the condensation products of sulfonated naphthalene and formaldehyde, such as sodium dinaphthylmethane disulfonate, are conveniently used. The dispersed paste is cut or standardized to a standard strength with a diluent, such as sodium sulfate or dextrin. As noted above, any conventional wetting agent, e.g., sodium cetyl sulfonate, may be added to wet out the product. The final color content of the finished paste averages from 10–40 percent by weight (pure color) active dyestuff base.

Standardized dispersed powders are prepared by wet milling color in the presence of a dispersant, such as those mentioned hereabove, in equipment, such as a ball mill, Werner-Pfleiderer mill or attritor. The dispersed material is oven or spray dried and micropulverized if necessary to provide the dispersed powder. The color is cut or standardized to a standard strength in a blender with a diluent, such as sodium sulfate or dextrin. A wetting agent, such as sodium cetyl sulfate or an alkylphenoxy polyethanol may be added to wet out the product. Dispersed powders are usually cut or standardized to 25–60% by weight color content (pure color).

The individual dyestuff components, standardized as described above, are blended in the above-indicated proportions. The black shades thus obtained range, depending upon the relative amounts of orange components, from greenish- to reddish-black. Deep jet black dyeings are obtained by using more blue component in the formulation. The dyestuffs are applied by known methods for dyeing polyesters, either in a dispersion with a carrier at 50–100° C. or without a carrier at 100–150° C. under pressure. Printing and padding are carried out in the presence of suitable thickening agents followed by fixation at high temperature with or without steam. As noted above, the novel dyestuff mixtures produce uniform black shades over a temperature range of 180–220° C. when applied by the Thermosol process.

My invention is further illustrated by the following examples:

EXAMPLE I

A mixture was prepared consisting of 70 parts by weight of dispersed paste containing 14 percent pure dyestuff of the formula:

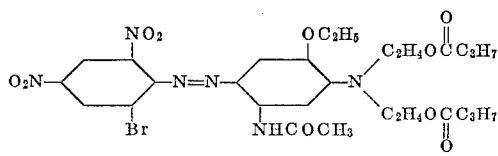

25 parts by weight of paste containing 26 percent pure dyestuff of the formula:

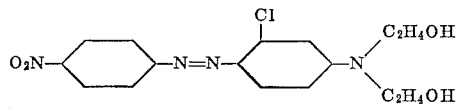

and five parts by weight of paste containing 28 percent pure dyestuff of the formula:

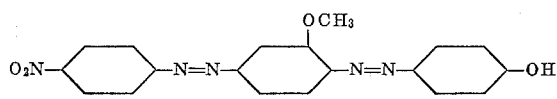

The three individual dyestuffs were previously standardized in the conventional manner as follows:

A dispersion was prepared containing 14 percent of the monoazo blue dye and 36 percent sodium lignin sulfonate dispersant, together with a small amount of glycerine and enough water was added to bring the solids content of the paste to 50 percent by weight. The paste was then milled until the dyestuff was sufficiently dispersed. The disazo orange dye was dispersed in a similar manner with the resulting 50 percent paste containing 26 percent pure dyestuff. The monoazo orange dye is dispersed in a similar manner with the resulting 50 percent paste containing 28 percent pure dyestuff.

An aqueous solution of one percent by weight of monosodium phosphate and 20 percent by weight, based on the weight of fabric dyed, of a commercially available phenolic carrier was prepared. The resulting solution was heated to 120° F. and 10 g. of Dacron polyester fabric was added thereto. The temperature was maintained for ten minutes and 0.8 gram of the dyestuff mixture prepared as described above was added. The resulting bath was heated to 208° F. and maintained at this temperature for 90 minutes. The dyed fabric was removed and after-soaped by working it in a one percent soap solution at 180° F. for ten minutes. It was thereafter rinsed and dried. The dyed fabric appeared jet black in color and was characterized by excellent sublimation fastness and good light fastness.

EXAMPLE II

The procedure of Example I was repeated with the exception that the proportions of orange components in the mixture were varied to provide a composition having 20 parts of the same paste of the monoazo orange dyestuff and ten parts of the same paste of the disazo dyestuff. The dyed fabric appeared slightly greenish-black in color and was characterized by good light fastness and excellent sublimation fastness. The shade can be rendered jet black by increasing the relative amount of blue component in the above mixture.

EXAMPLE III

The procedure of Example I was repeated with the exception that the proportions of orange components in the mixture were varied to provide a composition having 15 parts of the same paste of the mono-azo orange dyestuff and 15 parts of the same paste of the dis-azo dyestuff. The dyed fabric appeared greenish black in color and was characterized by good light fastness and excellent sublimation fastness. The shade can be rendered jet black by increasing the relative amount of blue component in the above mixture.

EXAMPLE IV

The procedure of Example I was repeated with the exception that the mono-azo dye of the formula:

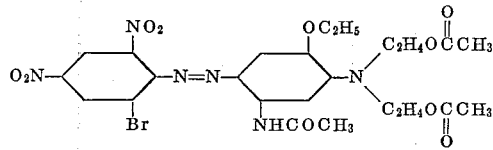

was used as the blue component. The fastness properties and shade of the resulting dyeing corresponded to those of Example I.

EXAMPLE V

The procedure of Example IV was repeated using the relative proportions of orange components of Example II. The resulting dyeing was slightly greener in shade than that of Example II, and was characterized by good to excellent fastness properties.

EXAMPLE VI

The procedure of Example IV was repeated using the relative proportions of orange components of Example III. The resulting dyeing was slightly deeper in shade than that of Example III, and was characterized by good to excellent fastness properties.

EXAMPLE VII

A dyestuff containing the dyestuff composition of Example I was prepared in a concentration of 12 ounces of dye per gallon of water (90 g./l.). The "Dacron" polyester fiber was then padded with the dyestuff at 120° F. Three test specimens of the padded fabric were dried by hot air (the Thermosol process) at temperatures of 360° F., 390° F., and 420° F. respectively for 90 seconds. The dyed fabrics were then after-soaped as described in Example I. Comparative dyeings were made using the same three temperature conditions with a commercially available disperse black dye for polyester. The results obtained are shown in the following table:

TABLE I

| | Shade at Thermosol temperature, ° F. | | |
| --- | --- | --- | --- |
| | 360 | 390 | 420 |
| Commercial Black | Brownish-black | Brownish-black | Black. |
| Example I Black | Black | Black | Jet black. |

It is thus seen that, using the dyestuffs of the invention, the Thermosol temperature can be varied considerably without departure from a true black shade in the ultimate dyeing.

EXAMPLE VIII

A printing paste was made using 80 parts by weight of the dyestuff composition of Example I in the form of a dispersed powder, 420 parts by weight water, and 500 parts by weight of a commercially available aliginate thickener. The paste was printed on polyester cloth, dried and thermo-fixed with hot air at 420° F. as in Example VII. A jet black of excellent fastness properties was obtained.

EXAMPLES IX THROUGH XXIV

Variation of the individual components of the dyestuff mixture of the invention and the relative proportions of these components gives the following results on "Dacron" polyester fiber. The term "parts" used in the table indicates parts by weight pure (active) dyestuff base.

TABLE II.—DYESTUFF MIXTURE

| Ex. No. | Dyestuff Formula (I) | | | | | | Dyestuff Formula (II) | | | | | | Dyestuff Formula (III) | | | | | Dyeing Properties | | |
|---|---|---|---|---|---|---|---|---|---|---|---|---|---|---|---|---|---|---|---|---|
| | X | $R_1$ | $R_2$ | $R_3$ | $R_4$ | Parts | $X_1$ | $X_2$ | $R_1$ | $R_2$ | Parts | | $X_1$ | $X_2$ | Z | $R_1$ | $R_2$ | Parts | Light | Sublimation | Shade |
| 9 | Br | $CH_3$ | $CH_3$ | $C_3H_7$ | $C_3H_7$ | 50 | Cl | H | $CH_3$ | H | 10 | | Cl | H | Cl | H | H | 40 | Good | Excellent | Black |
| 10 | Br | $CH_3$ | $CH_3$ | $C_3H_7$ | $C_3H_7$ | 65 | Cl | H | $CH_3$ | H | 5 | | Cl | H | Cl | H | H | 30 | do | do | Do |
| 11 | Br | $CH_3$ | $CH_3$ | $C_3H_7$ | $C_3H_7$ | 60 | H | Cl | $CH_3$ | H | 10 | | H | H | Cl | H | H | 30 | do | do | Reddish black |
| 12 | Br | $CH_3$ | $CH_3$ | $C_2H_5$ | $C_2H_5$ | 60 | H | H | $CH_3$ | H | 10 | | H | H | Cl | H | H | 30 | do | do | Black |
| 13 | Cl | $CH_3$ | $CH_3$ | $C_2H_5$ | $C_2H_5$ | 50 | H | Cl | $C_2H_5$ | H | 25 | | H | Cl | Cl | H | H | 25 | do | do | Greenish black |
| 14 | Br | $CH_3$ | $CH_3$ | $C_3H_7$ | $C_3H_7$ | 50 | Br | H | $C_2H_5$ | H | 5 | | Br | H | Br | H | H | 45 | do | do | Reddish black |
| 15 | Br | $CH_3$ | $CH_3$ | $C_7H_{15}$ | $C_3H_7$ | 50 | H | H | $C_2H_5$ | H | 10 | | H | H | Cl | H | H | 40 | do | Good | Black |
| 16 | Br | $CH_3$ | $CH_3$ | $C_3H_7$ | $C_3H_7$ | 50 | H | H | $C_2H_5$ | $CH_3$ | 5 | | H | H | $CH_3$ | H | H | 40 | do | Excellent | Do |
| 17 | Br | $CH_3$ | $CH_3$ | $C_3H_7$ | $C_3H_7$ | 50 | Cl | H | $C_2H_5$ | H | 15 | | H | H | Br | H | H | 35 | do | do | Reddish black |
| 18 | Br | $CH_3$ | $C_2H_5$ | $C_3H_7$ | $C_3H_7$ | 70 | H | H | $C_2H_5$ | H | 15 | | H | H | $CH_3$ | H | H | 15 | do | do | Jet black |
| 19 | Br | $CH_3$ | $CH_3$ | $C_3H_7$ | $C_3H_7$ | 50 | H | H | $C_2H_5$ | H | 10 | | H | H | Cl | H | H | 40 | do | do | Black |
| 20 | Br | $CH_3$ | $CH_3$ | $C_3H_7$ | $C_3H_7$ | 50 | H | H | $CH_3$ | H | 10 | | H | H | Cl | $OCH_3$ | $OCH_3$ | 40 | do | do | Do |
| 21 | Br | $CH_3$ | $CH_3$ | $C_3H_7$ | $C_3H_7$ | 80 | Cl | H | $CH_3$ | H | 10 | | Cl | H | Cl | H | H | 10 | do | Very good | Reddish black |
| 22 | Br | $CH_3$ | $C_2H_5$ | $C_3H_7$ | $C_3H_7$ | 50 | H | H | $C_2H_5$ | H | 10 | | H | H | Cl | H | H | 40 | do | Excellent | Jet black |
| 23 | Br | $C_2H_5$ | $CH_3$ | $C_3H_7$ | $C_3H_7$ | 50 | H | H | $C_2H_5$ | H | 10 | | H | H | Cl | H | H | 40 | do | do | Black |
| 24 | Br | $CH_3$ | $C_2H_5$ | $CH_3$ | $C_3H_7$ | 50 | H | H | $CH_3$ | H | 10 | | H | H | Cl | H | $OC_2H_5$ | 40 | do | do | Do |

We claim:

1. A dyestuff mixture containing:
    (a) 50–80% by weight of pure color of a blue component consisting essentially of at least one monoazo dyestuff of the formula:

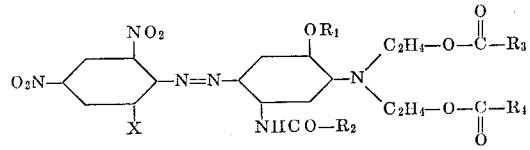

wherein X is a member selected from the group consisting of chlorine and bromine, $R_1$ is an alkyl radical having from 1–4 carbon atoms, and $R_2$, $R_3$, and $R_4$ are alkyl radicals having from 1–8 carbon atoms, and
    (b) 20–50% by weight of pure color of an orange component consisting essentially of
        (1) 10–50% by weight of pure color of at least one disazo dyestuff of the formula:

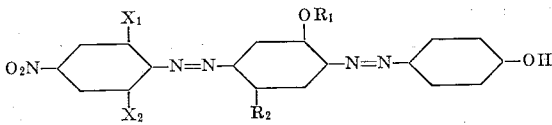

wherein $X_1$ and $X_2$ are selected from the group consisting of hydrogen, chlorine, and bromine, and $R_1$ is an alkyl radical having from 1–4 carbon atoms and $R_2$ is a member selected from the group consisting of hydrogen and lower alkyl, and
        (2) 50–90% by weight of at least one monoazo dyestuff of the formula:

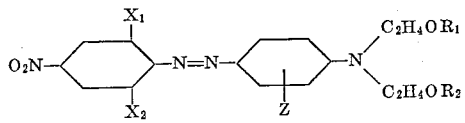

wherein $X_1$ and $X_2$ are selected from the group consisting of hydrogen, chlorine, and bromine, Z is selected from the group consisting of hydrogen, chlorine, bromine, and lower alkyl, and $R_1$ and $R_2$ are selected from the group consisting of hydrogen and acyl radicals having from 1–8 carbon atoms;

dispersed and standardized to provide 10–60% by weight active dyestuff base.

2. Polyester fibers dyed with the dyestuff composition of claim 1.

3. Process for coloring polyester fibers comprising dyeing said fibers with a dyestuff of claim 1.

4. A dyestuff mixture containing
    (a) 50–80% by weight of pure color of a blue component consisting essentially of at least one monoazo dyestuff of the formula:

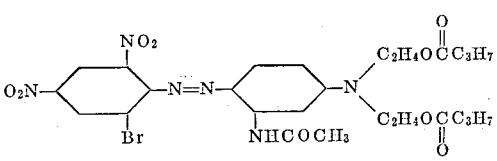

and
    (b) 20–50% by weight of pure color of an orange component consisting essentially of (1) 10–50% by weight of pure color of at least one disazo dyestuff of the formula:

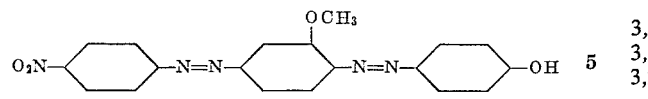

and (2) 50–90% by weight of at least one monoazo dyestuff of the formula:

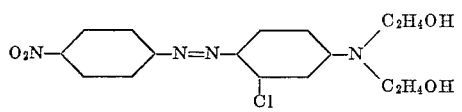

dispersed and standardized to provide 10–60% by weight active dyestuff.

References Cited

UNITED STATES PATENTS

| 3,122,410 | 2/1964 | Mueller et al. | 8—26 XR |
| 3,178,405 | 3/1965 | Merian | 8—41 |
| 3,253,876 | 5/1966 | Wilcox | 8—26 |

FOREIGN PATENTS

| 541,730 | 2/1941 | Great Britain. |

NORMAN G. TORCHIN, *Primary Examiner.*

D. LEVY, *Assistant Examiner.*